United States Patent [19]

Ohashi et al.

[11] 4,013,615
[45] Mar. 22, 1977

[54] ELECTROSTATIC SPRAY COATING POWDER PIGMENT COMPOSITION AND PROCESS FOR PRODUCING THE SAME

[75] Inventors: Koichi Ohashi, Musashino; Yuzi Takahasi, Koganei; Takashi Suzuki, Chofu, all of Japan

[73] Assignee: Tekkosha Co., Ltd., Tokyo, Japan

[22] Filed: Sept. 10, 1974

[21] Appl. No.: 504,736

Related U.S. Application Data

[63] Continuation-in-part of Ser. No. 469,537, May 13, 1974, abandoned.

[30] Foreign Application Priority Data

May 14, 1973 Japan .................. 48-52474
Sept. 10, 1973 Japan .................. 48-101223
Sept. 26, 1973 Japan .................. 48-107627

[52] U.S. Cl. .................. 260/42.53; 260/42.55
[51] Int. Cl.$^2$ .................. C08J 3/20
[58] Field of Search .................. 260/42.53, 42.55

[56] References Cited

UNITED STATES PATENTS

| | | | |
|---|---|---|---|
| 2,687,394 | 8/1954 | Sommermeyer | 260/42.55 |
| 3,133,893 | 5/1964 | Newman | 260/42.53 |
| 3,393,165 | 7/1968 | Evans | 260/42.53 X |
| 3,502,582 | 3/1970 | Clemens et al. | 260/42.53 X |

Primary Examiner—Donald E. Czaja
Assistant Examiner—S. M. Person
Attorney, Agent, or Firm—Woodhams, Blanchard and Flynn

[57] ABSTRACT

A vinyl monomer alone, or a mixture of a vinyl monomer and at least one comonomer copolymerizable with said vinyl monomer and having a faster rate of polymerization than the rate of polymerization of the viny monomer, is emulsion-polymerized in an aqueous medium in the presence of a surface active agent and a pigment and, if required, other additives, under vigorous stirring. The polymer particles are substantially spherical. They do not contain interconnected pigment particles on the surface thereof but rather the pigment particles are substantially uniformly distributed in the interior of the polymer particles. There is obtained a powder composition adapted for electrostatic spray coating. When an agent for preventing thermal cracking is added to the emulsion polymerization reaction mixture after the completion of polymerization, there is obtained an electrostatic spray coating powder paint composition which does not become deteriorated if the coating film is heated at high fusing temperatures.

18 Claims, No Drawings

ELECTROSTATIC SPRAY COATING POWDER PIGMENT COMPOSITION AND PROCESS FOR PRODUCING THE SAME

CROSS REFERENCE TO RELATED APPLICATION

This application is a continuation-in-part of U.S. Ser. No. 469,537, filed May 13, 1974, now abandoned, the entire contents of which are incorporated herein by reference.

BACKGROUND OF THE INVENTION

1. FIELD OF THE INVENTION

This invention relates to vinly polymer-type electrostatic spray coating powder paint compositions and processes for preparing the same.

2. DESCRIPTION OF THE PRIOR ART

Heretofore, there have been conventionally used solution-type paints in which the paint components are dissolved in an organic solvent or emulsion-type paints in which the paint components are dispersed in an aqueous medium.

However, the former may possibly cause environmental pollution due to the evaporation of the organic solvent from the paint following application thereof. The latter has drawbacks because the film derived therefrom is lacking in desired physical and chemical properties. Accordingly, powder paints which do not use liquid carriers or vehicles have recently become available. Coating processes using these powder compositions have been developed. Domestic utensiles, steel furniture, general purpose piping, automobile parts, etc. are painted with such powder paints. There are various modes for painting with such dry paint compositions. Recently the electrostatic dry spray painting has become important. In this process the paint powder suspended in air is charged with a high voltage while it is flowing through the air to cause some electrostatically to adhere onto the article being painted. The article is heated to melt the powder and thereby form a paint film.

Vinyl powder paints conventionally used as electrostatic dry spray coating powder paints are produced by the following methods:

1. A dissolution-deposition process in which, after the vinyl resin is dissolved in a solvent and additives such as pigments, plasticizers, stabilizers, etc. are added thereto, a non-solvent is added thereto with vigorous agitation of the mixture to precipitate the powder paint composition.

2. A fusion-pulverization method in which the resin is heated until it is molten, pigment and coating film forming elements are added thereto and mixed therein, and after the mixture is solidified, the solid mixture is pulverized.

3. A dry blending method in which the resin, pigment and coating film forming elements are mixed by a high speed rotary mixer.

However, the first method (1) must employ a solvent, and it is further necessary to carry out the steps of dissolving the resin, precipitating the powder paint particles and recovering the solvent. In the second method (2) the resulting powder particles thereby obtained are broken pieces so that it is difficult to form therefrom a coating film having a flat and smooth surface. In the third method (3) there can be obtained only resin particles which are externally coated with the pigment particles.

Recently there have been proposed the following various methods in addition to the aforementioned methods.

In one method, there is disclosed a method of producing a powder paint in which a vinyl chloride monomer, or a vinyl chloride monomer and comonomers such as vinyl acetate, vinyl ether, etc., is suspension-polymerized in the presence of carbon black and using an oil-soluble polymerization initiator (organic peroxide) such as diisopropylperoxydicarbonate, azobisisobutyronitrile (Japanese Open-Laid Patent Publication No. 29475/72). However, according to this method, the pigment is not sufficiently dispersed in the powder particles, and its polymerization yield is remarkably poor. In addition, the size of the obtained powder particles is not consistent and their thermal stability is poor, and further, blocking thereof occurs during storage.

Japanese Open-Laid Patent Publication No. 976/73 discloses a method of obtaining a unplasticized polyvinyl chloride composition adapted for machining in which the polymerization is effected with the addition of agents succh as stabilizer, lubricating agent, pigment, polymer denaturing agent, generally contained in unplasticized polyvinyl chloride compositions, before or during the polymerizing step and then adding a polymerization stopping agent to stop the polymerization. This method has several disadvantages, namely, that the pigment is not uniformly distributed in the interior of the polymer particles, the diameters of the particles are irregular, and the diameters of the particles are not controlled, and the polyvinyl chloride thus obtained is poor in thermal stability.

Japanese Open-Laid Patent Publication No. 10181/73 discloses a method of obtaining dispersible coating compositions which comprises mixing a resin containing carboxyl groups as a starting material with pigment, neutralizing the carboxyl groups in the mixture, emulsifying the mixture in water, adding a polymerizable monomer into the mixture and then effecting polymerization. Japanese Open-Laid Patent Publication No. 10182/73 discloses a method of obtaining a coating composition dispersed in water which comprises dispersing a pigment in a water-insoluble resin, then emulsifying the dispersion in water by using an emulsifying agent or dispersing agent, and adding a polymerizable monomer thereto and then polymerizing it. However, these methods are processes for producing coating compositions to be coated in the form of a dispersion in water. The diameters of the polymer particles of polymer are about 1 micron, and these are almost the same as the diameters of the particles of the polymer obtained by the conventional emulsion-polymerizing method which are unsatisfactory as an electrostatic powder paint.

SUMMARY OF THE INVENTION

It is, therefore, an object of this invention to provide a powder paint composition adapted for electrostatic spray coating, and a process for producing the same, in which the polymer particles are substantially spherical, and the pigment particles are not substantially contained on the surface thereof but rather are dispersed substantially uniformly in the interior of the polymer particles.

It is another object of this invention to provide an electrostatic spray coating powder paint composition, and a process for producing the same, which forms improved coating films at low temperature and which does not readily form cracks upon fusing.

It is a further object of this invention to provide an electrostatic spray coating powder paint composition, and a process for producing the same, which provides a coating film of superior exterior durability, impact resistance and flexibility.

It is still another object of this invention to provide an electrostatic spray coating powder paint composition, and a process for producing the same, in which the coating film does not deteriorate when heated at high fusing temperatures.

The present invention has been completed based on the following findings:

1. There can be obtained particles which are satisfactory for the above-described purposes by emulsion-polymerization, provided that the emulsion-polymerization is conducted simultaneously with vigorous stirring, and there can also be obtained substantially spherical powder particles which have proper size distribution and adapted for electrostatic spray coating and which have pigment therein.

2. If the monomers to be polymerized and the pigment and the surface active agent and additional agents such as agent for preventing aging deterioration, plastic flow rate improving agent, ultraviolet ray absorbing agent, hardening agent, thermostability improving agent, if required, are mixed in advance, the pigment can be uniformly dispersed in the interior of the polymer particles.

3. The bulk density of the powder composition thus obtained is preferably above 0.2 and most preferably above 0.3. If the bulk density is below 0.3, when the composition is coated and the powder particles thereof are melted and adhered to a substrate to form a coating film thereon, cracks form in the film. Furthermore, in order that this composition can be used as an electrostatic dry spray coating powder paint, its electrification property is important. If the volume intrinstic resistivity of the powder paint particles is below $10^9$ ohm-cm, the powder particles do not sufficiently adhere onto the articles to be painted, whereas if the volume intrinsic resistivity of powder paint particles is above $10^{13}$ ohm-cm, the powder particles once adhered thereto can be easily separated from the articles on which they are painted, and thus in both cases, a satisfactory coating film cannot be obtained.

This invention relates to electrostatic spray coating powder paint compositions in which the powder particles are substantially spherical, and a process for producing the same, in which emulsion-polymerization is performed with vigorous stirring of a reaction system containing a vinyl monomer, or a mixture of vinyl monomer and at least one comonomer copolymerizable with said vinyl monomer and having a rate of polymerization faster than the rate of polymerization of the vinyl monomer, in an aqueous medium, in the presence of a surface active agent and a pigment, and, if required, an agent for preventing aging deterioration, a fluidity improving agent, an ultraviolet absorbing agent, a thermal stability improving agent, hardening agent, etc. whereby to emulsion-polymerize the monomer (s) in such a manner that the pigment particles are not substantially maintained on the surfaces of the polymer particles thus obtained, but rather are substantially uniformly dispersed in the interior of the polymer particles.

The vinyl monomer employed in the invention includes vinyl chloride and one or more vinyl monomers having the formula:

wherein $R_1$ is H or $CH_3$, $R_2$ is a hydrocarbon group having 1 to 18 carbon atoms.

Examples of the vinyl monomers having the above structural formula include methyl acrylate, ethyl acrylate, butyl acrylate, 2-ethylhexyl acrylate, lauryl acrylate, stearyl acrylate, methyl methacrylate, ethyl methacrylate, butyl methacrylate, 2-ethylhexyl methacrylate, lauryl methacrylate, stearyl methacrylate, benzyl acrylate and phenyl acrylate. Normal-butyl methacrylate and ethyl methacrylate are preferred vinyl monomers of this formula. When two or more of the vinyl monomers are used, they can be mixed at any weight ratio.

The comonomers capable to copolymerization with the above vinyl monomers include glycidyl acrylate, glycidylmethacrylate, allylglycidylether, hydroxyethylacrylate, hydroxyethylmethacrylate, diethylaminoethylacrylate, diethylaminoethylmethacrylate, vinyl pyridine, acrylic acid, methyacrylic acid, maleic acid, maleic anhydride, dioctyl maleate, styrene, methyl styrene, vinyl toluene, N-methylolacrylamide, N-methylolmethacrylamide, acrylamide, methacrylamide, acrylonitrile, methacrylonitrile, butadiene, vinyl caprylate, isobutylvinylether, vinylidene chloride, itaconic acid, N-phenylmethacrylamide, 2-vinyl naphthalene, allyl acetate, allyl acrylate, vinyl isocyanate, vinyl acetate, vinyl propionate and vinyl urethane, etc., which have a faster rate of polymerization than the rate of polymerization of the vinyl monomer.

The powder paint composition obtained by emulsion-polymerization, according to the process of the present invention, of a vinyl monomer and a comonomer having a faster rate of polymerization than the rate of polymerization of the vinyl monomer, does not undergo blocking during storage. As the comonomer it is preferred to employ one whose homopolymer has a second order transition temperature lower than that of a homopolymer of the vinyl monomer, particularly of vinylchloride homopolymers.

The ratio of the copolymerizable monomer to the vinyl monomer is normally 2 to 185 parts by weight, preferably 5 to 100 parts by weight, per 100 parts by weight of the vinyl monomer. If the weight is less than this, when painting is conducted with the paint composition, it is difficult to form a coating film having a smooth and flat surface. If this ratio is higher than this, the painted film thus obtained is excessively weak.

The charging of the monomer (s) may be carried out by charging the entirety of the monomer (s) at the time of initiating the polymerization or they can be added in fractional portions during the course of the polymerization.

The average polymerization degree of the resulting vinyl chloride copolymer is preferably in the range of 300 to 600 when measured by JIS (Japanese Industrial Standard) K-6721. When the degree of polymerization is less than this range, the durability and thermostability of the coating film thus obtained are inferior, whereas when the degree of polymerization is above this range, a higher temperature is needed when the powder paint is sprayed and is thereafter fused to form the coating film, and accordingly, undesired decomposition of the plasticizer can occur.

The pigment used in this invention includes such inorganic pigments as zinc oxide, barium chromate, Prussian Blue, cadmium yellow, antimony sulfide, cadmium red, precipitated barium sulfate, zinc oxide, titanium oxide, ferric oxide red, iron black, chromium oxide, ultramarine blue, precipitated calcium carbonate, carbon black, lamp black, graphite, clay, cobalt blue, yellow ochre and the like; nitroarylene pigments such as naphtol green B, pigment green B, and naphtol yellow S; azo pigments such as permanent red 4R, brilliant fast scarlet, Hansa yellow 3G, benzidineyellow, lithol red, lake red C, brilliant carmine 6B, permanent red F5R, pigment scarlet 3B, para red and the like; phthalocyanine pigments such as phthalocyanine blue, phthalocyanine green, fast sky blue and the like, and organic pigments such as permanent red BL, isoindolenone pigments, dioxazine violet, aniline black, quinacridone red and the like.

The amount of pigment is preferably 0.1 to 50 weight percent based on the total amount of monomers.

It is effective for keeping the pigment in the interior of the powder particles and to obtain substantially spherical particles, to premix one or more kinds of these pigments with a portion of the vinyl monomer or comonomer, a surface active agent, an agent for preventing deterioration, and/or other additives, etc. in advance such as by means of a three roll mill, a ball mill, etc., and then to add them at the beginning or during polymerization of the remaining monomer (s). In this case, the amount of the monomer used for mixing with the pigment is preferably more than 0.5 weight percent of total monomers.

It is necessary to incorporate a stabilizer in the polymer for preventing deterioration thereof, when the polymer include vinyl chloride units. The agents effective for preventing deterioration are added at the start of polymerization or during the course of polymerization. They include an organic tin compound such as dibutyl tin dilaurate or dibutyl tin maleate, an epoxy compound such as epoxidized soy bean oil, an epoxy resin obtained by condensation of epichlorohydrin with 2-2-bis (4-hydroxyphenyl) propane, or 3,4-epoxy-6-methylcyclohexyl-3',4'-epoxy-6'-methylcyclohexanecarboxylate or the like. The stabilizer for preventing deterioration can be a combination of the above mentioned agents. The amount of the stabilizer is preferably 0.01 to 15 weight percent, based on the total amount of monomers used. The stabilizer can be added in one charge at the beginning of the polymerization or it can be added in fractional portions during the course of polymerization.

A plastic flow rate improving agent can be added, if required. Suitable plastic flow rate improving agents are conventional plasticizers such as dibutyl phthalate, 2-ethylhexyl phthalate, 2-ethylhexyl adipate, tricresyl phosphate, tetraisooctyl pyromellitate, a chloride of a normal paraffin and the like, or a high molecular weight polyester or epoxy plasticizer compound.

The amount of the plastic flow rate improving agent is up to 30 weight percent, based on the total monomers, preferably up to 10 weight percent. The plastic flow rate improving agent can be added at once at the start of the polymerization or it can be added gradually step by step during the advancement of t the polymerization.

The surface active agent or surfactants used in the emulsion-polymerization of the present invention are known surfactants, but the amount thereof that is used is remarkably higher than the amount conventionally used. The amount of surfactant is at least 3 by weight percent, preferably 5 weight percent or more, based on the total amount of monomers. However, the use of more than 20 weight percent of monomer is not economic and is unnecessary. If the amount of surfactant is less than 3 weight percent, it is difficult to cause the pigment to become present inside the polymer particles. Particularly preferred surface active agents used in the present invention includes such anionic surface active agents having an HLB (hydrophilic-lipophilic balance) of more than 8 such as sodium dodecylbemzenesulfonate, polyethyleneglycolalkylethersulfate, sodium dialkylsulfosuccinates, or the like, nonionic surface active agents such as polyethylenegycolsorbitanalkylethers, sorbitanalkylesters, polyethyleneglycolphenylethers, polypropyleneglycol polyethyleneglycolethers and the like, and cationic surface active agents such as alkylpicolinium chloride, alkyltrimethylammonium chloride or the like.

These surface active agents can be used as a mixture of two or more of such agents. When two or more of the pigments are used, these surfactants give extremely good results.

In the process of this invention, the polymerizing reaction can be carried out under alkaline or acidic conditions. pH adjusting agents include sodium hydrogen carbonate, ammonium carbonate, acetic acid, etc.

Other optional additives that can be used include ultravoilet absorbing agents, thermal stability improving agents, molecular weight adjusting agents, fluidity improving agents, hardening agents, etc.

Referring to the ultraviolet absorbing agent and thermal stability improving agents, there can be mentioned 2-hydroxy-4-methoxybenzophenone, 2,4-dihydroxybenzophenone, 2-(2'-hydroxy-5'-methylphenyl) benzotriazol, phenyl salicylate, dioctylsulfide, 1,3,8 -triazo - 7,7,9,9-tetramethyl-2,4-dioxy-spiro- 4,5-tetramethyl-2,4-dioxy-spiro-4,5-decane,2-cyanoethyloctylmercaptan and the like. One or more than one ultraviolet absorbing agent can be used.

The plastic flow rate improving agent further includes an epoxy resin by condensation of epichlorohydrin with 2,2-bis (4-hydroxyphenyl) propane and resins capable of enhancing the plastic flow rate of the polymer of the composition. The content thereof is preferably 0.5 to 30% by weight, based on the total weight of monomers.

The molecular weight adjusting agent employed in this invention includes ethylmercaptan, propylmercaptan, butylmercaptan, octylmercaptan, dodecylmercaptan, 2-mercaptoethanol, thiophenol, ethylmercaptoacetate as mercaptans and carbon tetrachloride as a compound effective in a chain reaction.

A heat curable (thermosetting) powder paint of acrylic resin can be produced according to this invention. The curing agents used for this purpose include dicyandiamide, borontrifluoride-piperidine, an epoxy compound or acid anhydride as a compound effective in reacting with acrylic resin to cure same.

One or more of these curing agents can be used. The entirety thereof can be added at the start of polymerization, or portions can be added during the polymerization or it can be added into the obtained emulsion or the powder after the polymerization is complete.

The vigorous agitation employed in the process of this invention is not practiced in the conventional emulsion-polymerizing reactions because it was assumed to cause bad results. In the present invention, this vigorous stirring provides a particularly good effect on the diameters or particle sizes of the polymer particles produced. The size of the polymer particles is closely related to the appearance of the coating film, the performance of coating film, and the operability of the electrostatic painting. That is, in order to obtain a thin coating film, the smaller the size of the polymer particles, the better are the results. Whereas in order to obtain a thicker coating film, the larger the size of the particles, the better are the results. However, when the diameters of the polymer particles are extremely small, the recovery rate of the powder paint during painting becomes poorer, so that the results of the painting operation become poorer.

According to the process of the present invention, the diameters of the polymer particles are easily adjusted, within the range of 30 to 250 microns. Thus, if the particle size of the powder is properly adjusted, it is easy to remove the polymerizing heat generated during the polymerization, and it also is easy to separate the polymerized product.

In order to separate the polymerized product from the reaction solution, conventional filtering devices, centrifugal settling devices, centrifugal filtering devices, etc. are used. Particularly, decanting type continuous discharge centrifugal settling devices, basket type centrifugal filtering devices, etc. are used.

The drying of the powder particles thus produced can be conducted by any conventional method such as, the flash drying method, the fluidized bed drying method, the vacuum drying method, the process of drying in a dryer having shelves therein or combinations thereof.

The powder which may agglomerate into lumps during the drying step can be subdivided into the desired size by using a suitable pulverizer.

According to the present invention, there can be obtained superior vinyl powder paint compositions particularly useful for dry electrostatic spray coating as will be hereinafter described. This unexpectedly improved result is achieved as a consequence of the presence of a relatively large amount of surface active agent in the reaction system undergoing emulsion-polymerization, in combination with the vigorous stirring of the reaction system during said polymerization.

The term "vigorous stirring" means the stirring conditions conventionally employed in the suspension polymerization process. For example, vigorous agitation includes rotating at 200 to 1,200 rpm an agitator having blades of the turbine blade type in the presence of baffle plates. Stated in different terms, for vigorous stirring the circulation number is 3 or more circulations per minute, preferably 5 to 30 circulations per minute, wherein circulation number = integrated volume of circulating flow per minute divided by the total volume of liquid in tank: See "Reaction Technology of Polymerization" published by Chemical Dojin Co., Ltd. on page 64 on special issue No. 34, edited by Masu Yamazaki.

In contrast the stirring conditions in the conventional emulsifying polymerization are relatively slow. For example, the stirring speed of the agitator in case of using a paddle type or anchor type blades is 40 to 60 rpm, corresponding to a circulation number of 2 per minute. The dispersion medium, the polymerization initiator and the polymerizing degree adjusting agent (chain stopping agent) used in the process of the present invention are all conventional. The dispersion medium includes aqueous media such as water or water-methanol mixture, and preferably is water. The amount of dispersion medium is 75 to 1000 weight percent, based on the total amount of the monomers, preferably 200 to 400 percent. If the amount of dispersion medium is below this range, it is difficult to remove the polymerization heat, whereas if it is higher than this range, the bulk specific density of the powder paint composition particles thus obtained becomes less than 0.30, there occurs a concentration of coating film during fusing and film-forming operations so that cracks occur with the result that a satisfactory coating film cannot be obtained. As the polymerization initiator, there are used water-soluble polymerization initiators such as hydrogen peroxide, ammonium persulfate, potassium persulfate or a water-soluble redox catalyst, etc. Two or more of the above agents can be used in combination. The entire amount of initiator can be added at the start of the polymerization or fractional amounts can be added as the polymerization advances. The amount of initiator is preferably 0.01 to 30 weight percent, based on the total amount of monomers.

As the polymerization degree adjusting agent, there can be used less than 1 weight percent of carbon tetrachloride, n-butylmercaptan, thiophenol, etc. based on the total amount of monomers.

Heretofore, because pigments are usually poor in their electric insulating property, the volume intrinsic resistance of powder coatings in which the pigment is dispersed as a coating on the surfaces of the powder particles, is normally far broader than the above-described range. Accordingly, such powders are not satisfactory for use as an electrostatic dry spray coating powder paint. On the other hand, the electrostatic spray coating powder paint composition of the present invention does not substantially include contiguous pigment particles on the surface thereof, but rather the pigment particles are substantially uniformly dispersed in the interior thereof. The powder coating composition of this invention also includes an agent for preventing deterioration and, if required, a fluidity improving agent. The powder coating composition of this invention comprises substantially spherical particles having a particle size of approximately 30 to 250 microns in diameter, a volume intrinsic resistivity of $10^9$ to $10^{13}$ ohm-cm and a bulk density of more than 0.3. The substantially spherical particles contain pigment particles dispersed in a substantially homogeneous state in the interior of the resin particles, and the resin particles are substantially free of interconnected or contiguous pigment particles on the surfaces of the resin particles. Therefore, this powder coating composition exhibits a desirable range of volume intrinsic resistivity to make it suitable for use as an electrostatic dry spray paint composition, and yet when it is fused after it is applied to the substrate, a highly advantageous coating film can be obtained by heating at a lower temperature than that employed in the case of a conventional vinyl chloride powder paint. This powder paint composition has a bulk density of more than 0.3 and the particles are substantially spherical in shape, and accordingly substantially no cracks occur as a consequence of the aforementioned fusing.

As the resin components of conventional powder paints, there have been used vinyl chloride resin or epoxy resin. However, the powder paint composed of epoxy resin has such disadvantages as poor durability, poor impact strength, poor flexibility, etc. of the coating film formed therefrom and such paints are expensive. On the other hand, vinyl chloride powder paint exhibits relatively good properties and is relatively less expensive. However, it has been difficult to provide vinyl chloride powder paints suitable for use in electrostatic dry spray coating. This invention is intended to solve this problem.

In order to perform the process of the present invention, after part or all of the liquid comonomer capable of copolymerizing with vinyl monomer used in the present invention is mixed in advance with part or all of the surface active agent, the powder paint composition is produced under the above-described conditions. This mixing can be easily conducted by conventional methods such as, for example, by using roll mills, ball mills and the like. Thus, the pigment is further preferably dispersed into the particles so that the shapes of the particles are further improved. In this case, the amount of the vinyl monomer mixed with the pigment and the comonomer capable of copolymerizing with the vinyl monomer is over 0.5 by weight percent, based on the total monomers used in the polymerization.

Further, if the powder particles having absorbed thermal decomposition preventing agent on their surfaces are separated from the aqueous medium phase after the thermal decomposition preventing agent is added to the reaction system after emulsioncopolymerization according to the aforementioned process of the present invention is complete, there exists a high amount of thermal decomposition preventing agent on the surface of the particles. This suppresses the thermal decomposition that might otherwise occur during fusing of the powder paint composition. Accordingly the thermal decomposition can be effectively limited without detriment to the other properties of the particles, and therefore, even if a higher fusing temperature is employed, the coating film does not deteriorate.

The process for producing the powder paint and the paint composition obtained according to this process have the following advantages and effects:

1. The powder paint obtained according to the present invention is composed of particles whose exterior surface is comprised of exposed resin so that the particles can easily adhere and merge with each other during fusing. Therefore, the fusing temperature can be lower by 20° to 40° C. in comparison with the fusing temperatures required when there is used a powder paint prepared by the conventional dry blending method.

2. Because the fusing temperature can be lower, as aforesaid, the resin is less subject to deterioration and discoloration.

3. Because substantially spherical particles are obtained in the present invention, the fluidity of the powder itself is superior and the thickness of the coating film can be easily controlled, and the powder is particularly advantageous for use as a paint powder for dry electrostatic spray coating.

4. The process of preparing the powder is simplified in comparison with the conventional process and the cost of producing the powder is reduced.

The present invention is further illustrated by the following non-limitative examples.

Unless otherwise indicated, in the examples all references to "parts" mean parts by weight.

EXAMPLE 1

A paste, which was prepared by mixing well 30 parts of carbon black, 70 parts of polyethyleneglycolsorbitan monolaurate, 21 parts of 3,4-epoxy-6-methylcyclohexyl-3',4'-epoxy-6'-methylcyclohexanecarboxylate and 95 parts of butyl acrylate in a high speed mixer, was charged into a reaction vessel of a capacity of 50 l, a diameter of 35 cm and a height of 78 cm, the vessel having an agitator of three turbine vane type impellers, of which arms were 12.5 cm in length, and then 3 parts of ammonium persulfate, 0.5 part of n-butylmercaptan and 3300 parts of water were added into the reaction vessel.

After the reaction vessel was closed the ambient atmosphere in the reaction vessel was replaced with nitrogen gas and the gas pressure was reduced below atmospheric pressure. Then, 828 parts of vinyl chloride monomer was introduced into the reaction vessel. The agitator was driven at 800 rpm and the reaction mixture was heated at a temperature of 65° C.

The temperature and the agitation were maintained for 9 hours to effect polymerization. After the polymerization was complete, 50 parts of polymerized organic mercapto-compound was added, followed by agitation for an additional 30 minutes. The reaction product was recovered by centrifuging the reaction mixture and was dried.

A polymer powder having an average degree of polymerization of 420, a particle size of 80 to 150 microns, and a bulk density of 0.35, as measured by a powder tester manufactured by Micrometrics Laboratory of Japan, was obtained with a polymerization yield of 95%. The powder composition thus obtained was applied by electrostatic spray coating onto a plate of cold-rolled steel and the plate bearing the powder paint was heated at 185° C for 5 minutes to melt and fuse the powder.

A beautiful black coating film of 100 microns in thickness was obtained. No blocking of the powder composition was observed when it was stored at 40° C and the powder composition exhibited a good storage stability during the summer time. Some physical properties of the powder composition and the coating film formed therefrom shown in Table 1.

EXAMPLE 2

106 parts of a paste was prepared by mixing 45 parts of titanium dioxide pigment, 6 parts of carbon black powder, 20 parts of polyethyleneglycol dodecylphenylether, 7 parts of polypropyleneglycol polyethyleneglycolether, 6 parts of organic tin maleate, 60 parts of ethyl acrylate and 15 parts of lauryl methacrylate in a high speed mixer and by further rolling the resulting mixture in a three roller mill. The paste was charged into the reaction vessel used in Example 1 and then 0.2 part of ammonium persulfate, 0.2 part of potassium persulfate, 1 part of n-butylmercaptan and 600 parts of water were added into the reaction vessel. After the reaction vessel was closed, the ambient atmosphere in the reaction vessel was replaced with nitrogen gas and further the gas pressure was reduced below atmospheric pressure. Then 150 parts of vinyl chloride monomer was introduced into the reaction vessel.

The agitator was driven at 600 rpm and the reaction mixture was heated to 70° C. The temperature and the agitation were maintained for 12 hours to effect polymerization. After the polymerization 15 parts of di-m- octyl tin-S,S'-bis (isooctyl mercaptoacetate) was added, and the agitation was continued for another 30 minutes.

The reaction product was recovered by centrifuging the reaction mixture and was dried. A polymer powder having an average degree of polymerization of 490, a particle size of about 50 to 130 microns and a bulk density of 0.42 was obtained. The powder composition thus obtained was applied on a cold rolled steel plate by electrostatic spray coating and the plate bearing the powder paint was heated at 190° C for 5 minutes to fuse the powder.

A beautiful gray coating film of 180 microns in thickness was obtained. The stability of the powder paint was excellent and no blocking of the powder was observed. Some physical properties of the powder composition and the coating film formed therefrom are shown in Table 1.

EXAMPLE 3

A paste was prepared by mixing well 8 parts of phthalocyanineblue, 18 parts of polyethylene glycol oleylether sulfate, 5 parts of dibutyl maleate, 40 parts of butyl acrylate and 10 parts of glycidyl methacrylate in a high speed mixer. The paste was charged into a reaction vessel of a capacity of 5 l, 15cm in diameter, 35 cm in height, and equipped with an agitator having three turbine blade type impellers, of which arms were 4 cm in length, and then 2 parts of ammonium persulfate and 700 parts of water were added.

After the reaction vessel was closed, the ambient atmosphere in the reaction vessel was replaced with nitrogen gas and further the gas pressure was reduced below the atmospheric pressure. Then, 150 parts of vinyl chloride monomer was introduced into the reaction vessel.

The agitator was driven at 1000 rpm and the reaction mixture was heated at 70° C. The temperature and the agitation were maintained for 13 hours to effect polymerization. After the polymerization was complete, 15 parts of a polymerized organic mercapto-compound was added, followed by additional agitation for 30 minutes. The reaction product was recovered by centrifuging the reaction mixture and was dried. A polymer powder having an average degree of polymerization of 550, a particle size of 50 to 150 microns and a bulk density of 0.31 was obtained with a polymerization yield of 95%. This powder composition comprised particles in which the dispersed pigment was substantially covered by the polymer resin. This powder paint formed a uniform coating on a substrate of complex shape even at the corners thereof, when applied thereon by electrostatic spray coating. This coated substrate was heated at 200° C for 7 minutes and there was formed a beautiful blue coating of 120 microns in thickness. No appreciable shrinking of the coating film occurred.

It was proven that the storage stability of the powder paint was excellent and no appreciable blocking of the powder was observed at 40° C. Some physical properties of the powder composition and the coating film formed therefrom are shown in Table 1.

EXAMPLE 4

A paste was prepared by mixing thoroughly 60 parts of titanium dioxide pigment, 10 parts of sodium dodecylbenzene-sulfonate, 22 parts of polyethyleneglycol laurylether, 4 parts of organic tin maleate and 40 parts of butyl acrylate in a high speed mixer. The paste was charged into a reaction vessel of a capacity of 7000 l, 160 cm in diameter and 326 cm in height, provided with an agitator having three turbine vane type impellers, of which the arms were 20 cm in length, and then 1 part of ammonium persulfate, 0.1 part of thiophenol and 1500 parts of water were added into the reaction vessel.

After the reaction vessel was closed the ambient atmosphere in the reaction vessel was replaced with nitrogen gas and further the gas pressure was reduced below atmospheric pressure. Then, 360 parts of vinyl chloride monomer was introduced into the reaction vessel.

The agitator was driven at 400 rpm and the reaction mixture was heated at 65° C. The temperature and the agitation were maintained for 15 hours to effect polymerization. After the polymerization was complete, 30 parts of a polymerized organic mercapto-compound was added, followed by additional agitation for another 30 minutes. The reaction product was recovered by centrifuging the reaction mixture and was dried. A polymer powder having an average degree of polymerization of 510, a particle size of 80 to 150 microns and a bulk density of 0.35 was obtained with a polymerization yield of 95%. A beautiful white coating film was obtained by effecting a coating using the polymer powder as the powder paint in the same manner as described in Example 1, except that the temperature of fusion was 190° C. The storage stability of the powder paint was excellent and no appreciable blocking of the powder was observed at 40° C. Some physical properties of the powder composition and the coating film formed therefrom are shown in Table 1.

EXAMPLE 5

A paste was prepared by mixing thoroughly 10 parts of quinacridone red, 16 parts of alkylpicolinium chloride, 4 parts of epoxidized soybean oil, 0.1 part of acrylic acid, 30 parts of butyl acrylate, 5 parts of methyl methacrylate and 5 parts of diethylhexyl phthalate in a high speed mixer. The paste was charged into a reaction vessel of a capacity of 5 l, 15 cm in diameter and 35 cm in height, provided with an agitator having three turbine vane type impellers, of which arms were 4 cm in length, and then 1 part of ammonium persulfate, 0.04 part of thiophenol and 450 parts of water were added into the reaction vessel. After the reaction vessel was closed, the ambient atmosphere in the reaction vessel was replaced with nitrogen gas and further the gas pressure was reduced below atmospheric pressure. Then, 165 parts of vinyl chloride monomer was introduced into the reaction vessel. The agitator was driven at 800 rpm and the reaction mixture was heated at 65° C. The temperature and the agitation were maintained for 12 hours to effect polymerization. After the polymerization was complete 10 parts of a polymerized organic mercapto-compound was added, followed by additional agitation for another 5 minutes. The reaction product was recovered by centrifuging the reaction mixture and was dried.

A polymer powder having an average degree of polymerization of 530, a particle size of 50 to 180 microns and a bulk density of 0.45 was obtained with a polymerization yield of 93%.

A beautiful red continuous coating film of 80 microns in thickness was obtained by forming a coating using the polymer powder as the powder paint in the same manner as in Example 4. No appreciable blocking phenomenon of the powder paint was observed at 40° C. The storage stability thereof was excellent. Some physical properties of the powder composition and the coating film are shown in Table 1.

EXAMPLE 6

A paste was prepared by mixing thoroughly 15 parts of Fast Yellow pigment, 16 parts of polyethyleneglycol oleylether sulfate, 5 parts of organic tin maleate, 20 parts of methyl acrylate and 3 parts of 2-ethylhexyl phthalate in a high speed mixer. The paste was charged into the same reaction vessel used in Example 3, and then 0.6 part of potassium persulfate and 500 parts of water were added into the reaction vessel.

After the reaction vessel was closed the ambient atmosphere in the reaction vessel was replaced with nitrogen gas and further the gas pressure was reduced below atmospheric pressure. Then, 190 parts of vinyl chloride monomer was introduced into the reaction vessel. The agitator was driven at 1200 rpm and the reaction mixture was heated at 70° C. The temperature and the agitation were maintained for 8 hours to effect polymerization.

After the polymerization was complete, 15 parts of a polymerized organic mercapto-compound was added, followed by additional agitation for another 30 minutes. The reaction product was recovered by centrifuging the reaction mixture and was dryed.

A polymer powder having an average degree of polymerization of 560, a particle size of 80 to 170 microns and a bulk density of 0.39 was obtained with a polymerization yield of 94%.

A yellow coating film of 120 microns in thickness was obtained by effecting coating using the polymer powder as the powder paint in the same manner as in Example 1. No appreciable blocking phenomenon of the powder paint was observed at 40° C. The storage stability thereof was excellent.

Some physical properties of the powder paints obtained in the above-mentioned Example as well as the coating film formed therefrom are listed in Table 1. For purposes of comparison, the corresponding properties of the powder paints obtained in the below-mentioned comparative tests and of the coating films formed therefrom are also given in Table 1.

COMPARATIVE TEST 1

Into the reaction vessel used in Example 3 there were charged 0.5 part of polyvinyl alcohol, 0.02 part of hydroxyethyl cellulose, 0.2 part of ethylcellulose, 2 parts of ethyl acrylate, 8 parts of vinyl propionate, 0.3 part of benzoyl peroxide and 400 parts of water. After the reaction vessel was closed the ambient atmosphere in the reaction vessel was replaced with nitrogen gas and further the gas pressure was reduced below atmospheric pressure. Then, 200 parts of vinyl chloride monomer was introduced into the reaction vessel. The agitator was driven at 800 rpm and the reaction mixture was heated at 75° C. The temperature and the agitation were maintained for 8 hours to effect polymerization, with the result that a polymer powder having an average degree of polymerization of 560 and a particle size of 60 to 160 microns was obtained (yield 92%). 100 Parts of the thus obtained polymer powder, 40 parts of 2-ethylhexyl phthalate, 15 parts of titanium dioxide pigment and 4 parts of tribasic lead sulfate were mixed in a high speed mixer by a dry-blending process to form a powder paint having a particle size of 80 of 190 microns. No satisfactory film was formed by effecting a coating using the resulting powder paint in the same manner as in Example 1, except that there was used a fusing temperature of 180° C. The plate loaded with the powder paint was further heated at 210° C for 5 minutes and there was obtained a flat coating film of 200 microns in thickness with a vigorous evaporation of the plasticizer. However the thus obtained coating film was soft and could be injured easily.

COMPARATIVE TEST 2

One part of a copolymer of methylvinylether and maleic anhydride (GANREZAN, a product of General Aniline and Film Co.), 0.1 part of hydroxyethylcellulose, 2 parts of ethylcellulose, 42 parts of titanium dioxide, 12 parts of epoxy resin formed by condensation of epichlorohydrin with 2,2-bis (4-hydroxyphenyl) propane, 5 parts of benzoylperoxide, 80 parts of butylacrylate and 533 parts of water were charged into the reaction vessel used in Example 3. After the reaction vessel was closed the ambient atmosphere in the reaction vessel was replaced with nitrogen gas and the gas pressure was reduced below atmospheric pressure. Then 187 parts of vinyl chloride monomer was introduced into the reaction vessel. The agitator was driven at 1000 rpm and the reaction mixture was heated at 60° C. The temperature and the agitation were maintained for 15 hours to effect polymerization. After the reaction was complete, 20 parts of polymerized organic mercapto-compound was added, followed by additional agitation for another 30 minutes. The reaction product was recovered by centrifuging the reaction mixture and was dried. White polymer powder having an average degree of polymerization of 490, a particle size of 150–500 microns, was obtained with a polymerization yield of 90% but their surfaces were covered with dispersed pigment, (resin and pigment separating each other).

No coating film was formed by effecting a coating using the thus obtained powder paint in the same manner as in Example 1 and fusing at 200° C. for 5 minutes. The plate loaded with the powder paint was further heated at 230° C. for 10 minutes to obtain a coating film, but the coating film was not flat and it was discolored because of heat decomposition.

COMPARATIVE TEST 3

A mixture of the following:
  vinyl chloride: 280 parts
  vinyl acetate: 110 parts
  butyl acrylate: 10 parts
  titanium dioxide: 63parts
  polyethyleneglycol sorbitanmonolaurate: 19 parts
  benzoyl peroxide: 11 parts
  organic tin mercapto-compound: 74 parts
  polymerized organic maleate: 10 parts
  n - butanol: 500 parts
was subjected to polymerization under the following polymerization conditions:
  polymerization temperature: 65° C
  polymerization time: 40 hours
  speed of agitator: 500 rpm However, the above-mentioned polymerized organic mercaptocompound was added after the polymerization reaction was complete.

Coarse polymer powder having an average degree of polymerization of 480, and a particle size of 500 to 2000 microns was obtained with a polymerization yield of 87%.

A coating ws formed by effecting coating using the resulting powder paint and fusing at 200° C for 10 minutes but the coating film was poor in heat stability and became discolored and it was poor in smoothness.

COMPARATIVE TEST 4

A mixture of the following:
vinyl chloride: 550 parts
vinyl propionate: 450 parts
titanium dioxide: 171 parts
polyethyleneglycol sorbitanmonolaurate: 65 parts
potassium persulfate: 4 parts
3,4- epoxy - 6 - methylcyclohexylmethyl 3',4' - epoxy - 6' -methylcyclohexane carboxylate: 21 parts
polymerized organic mercapto-compound: 50 parts
water: 2200 parts
was subjected to polymerization under the following polymerization conditions:
polymerization temperature 60° C polymerization time: 19 hours
speed of agitator 800 rpm However, the total quantity of the above identified polymerized organic mecapto-compound was added after the polymerization reaction was over. Polymer powder having an average degree of polymerization of 580, a particle size of 80 to 150 microns and a bulk density of 0.40 were obtained with a polymerization yield of 95%. Blocking of the powder paint was observed during storage at 40° C.

COMPARATIVE TEST 5

A powder paint was prepared by the process of Example 2 but using 0.1 part of benzoyl peroxide (oil soluble catalyst) instead of the ammonium persulfate and potassium persulfate used in Example 2, with the result that there was obtained a powder paint having a particle size of more than 300 microns and in which the pigment and resin separated from each other. This powder was unsuitable for electrostatic spray coating.

COMPARATIVE TEST 6

Following the procedure of Example 1, polymerization was carried out by using 18 parts of polyethyleneglycol sorbitanmonolaurate instead of 70 parts thereof with the result that there was obtained a powder paint having an average degree of polymerization of 400, a particle size of 100 to 200 microns and a bulk density of 0.39 with a polymerization yield of 92%. The surface of the powder was covered with dispersed pigment.

No appreciable coating film was formed by effecting coating using the thus obtained powder paint and fusing at 220° C.

This composition was unsatisfactory for electrostatic spray coating because of its remarkable low volume intrinsic resistivity of $10^7$ $\Omega$ cm.

COMPARATIVE TEST 7

Example 1 was repeated, modified by rotating the agitator at 150 rpm, with the result that the thus obtained emulsion particles were too small in size and they could not be separated from the liquid phase by centrifugation.

Then, 10 parts of sodium chloride were added into the emulsion, to precipitate the solid component thereof.

The solid component thereof was dried, and was pulverized to adjust its particle size to produce a powder composition having a size of 40 to 120 microns. The thus obtained powder composition was subjected to coating as in Example 1 and the plate bearing the powder paint was heated at 185° C for 9 minutes to effect fusion of the powder.

The resulting coating film was cracked and poor in heat stability.

COMPARATIVE TEST 8

Following the procedure of Example 3, but increasing the volume of water from 700 parts to 850 parts, polymerization was effected with the result that a polymer powder was obtained having an average degree of polymerization of 560, a particle size of 80 to 170 microns and a bulk density of 0.25 with polymerization yield of 94%. The thus obtained powder composition was well loaded onto a substrate of complex shape by means of electrostatic spray coating.

However, the coating film at the corners positions shrank and cracked on fusion at 200° C for 10 minutes.

COMPARATIVE TEST 9

A paste was prepared by mixing thoroughly 30 parts of titanium dioxide pigment, 18 parts of sorbitan monostearate, 4 parts of organic tin maleate, 30 parts of butyl acrylate and 10 parts of styrene in a high speed mixer. The paste was charged into a reaction vessel and 1 part of ammonium persulfate, 0.2 part of n-butylmercaptan and 500 parts of water were added into the reaction vessel.

After the reaction vessel was closed, the ambient atmosphere in the reaction vessel was replaced with nitrogen and further the gas pressure was reduced below atmospheric pressure. Then 160 parts of vinyl chloride were introduced into the reaction vessel. The agitator was driven at 800 rpm and the reaction mixture was heated at elevated temperature and polymerized. There was obtained a polymer powder most of which was more than 300 microns in size. This powder was unfit for electrostatic spray coating.

EXAMPLE 7

In the same manner as described in Example 1 a paste was prepared from 30 parts of carbon black, 90 parts of 2-ethylhexylphthalate, 70 parts of polyethyleneglycolsorbitan monolaurate, 21 parts of 3,4-epoxy-6-methylcyclohexyl-3',4'-epoxy-6'-methylcyclohexanecarboxylate and 9 parts of butyl acrylate.

The paste was charged into a reaction vessel as described in Example 1 and then 3 parts of ammonium persulfate and 3300 parts of water were added in it.

After the reaction vessel was closed the ambient atmosphere in the reaction vessel was replaced with nitrogen gas and further the gas pressure was reduced below atmospheric pressure. Then, 900 parts of vinyl chloride monomer was introduced into the reaction vessel.

The agitator was driven at 800 rpm and the reaction mixture was heated at a temperature of 68° C. The temperature and the agitation were maintained for 9 hours to effect polymerization.

After the polymerization was completed, 50 parts of polymerized organic mercapto-compound was added, followed by additional agitation for another 30 minutes. The reaction product was recovered by centrifuging the reaction mixture and was dried. A polymer powder having an average degree of polymerization of 500, a particle size of 70 to 140 microns and a bulk density of 0.38 (as measured by the powder tester as in Example 1) with a polymerization yield of 96%, was obtained.

The powder composition thus obtained was applied on a cold-rolled steel plate by the same procedure as described in Example 1. A beautiful black coating film of 100 microns in thickness was obtained. No blocking of the powder paint was observed at 40° C. The powder composition exhibited good storage stability during the summer season.

EXAMPLE 8

In the same manner as described in Example 2, 106 parts of a paste was prepared from 45 parts of titanium dioxide, 30 parts of 2-ethylhexyl phthalate, 6 parts of carbon black, 25 parts of polyethleneglycoldodecylphenylether, 7 parts of polypropyleneglycolpolyethyleneglycolether, 6 parts of organic tin maleate and 2 parts of vinyl acetate. The paste was charged into a reaction vessel as described in Example 2 and then 0.2 part of ammonium persulfate, 0.2 part of potassium persulfate, 1 part of n-butylmercaptan and 600 parts of water were added in the reaction vessel. Then, after closing the vessel, replacing the atmosphere therein with nitrogen and reducing the pressure in the vessel below atmospheric, 230 parts of vinyl chloride monomer were introduced into it.

The agitator was driven at 600 rpm and the reaction mixture was heated at a temperature of 60° C. The temperature and the agitation were maintained for 12 hours to effect polymerization.

After the polymerization 15 parts of di-n-octyltin-S,S'-bis(isooctylmercapto acetate) were added, followed by additional agitation for another 30 minutes. The reaction product was recovered by centrifuging the reaction mixture and was dried.

A polymer powder was obtained having an average degree of polymerization of 460, a particle size of about 40 to 120 microns and a bulk density of 0.39 with a polymerization yield of 93%.

The powder composition thus obtained was applied on a cold-rolled steel plate (J15-G-3141) by means of the electrostatic fluidized bed coating system and the plate bearing the powder paint was heated at 190° C for 5 minutes for fusing.

A beautiful gray coating film of 180 microns in thickness was obtained. The storage stability of the powder paint was excellent. No blocking of the powder was observed at a temperature of 40° C.

EXAMPLE 9

In the same manner as described in Example 3, a paste was prepared from 8 parts of phthalocyanineblue, 16 parts of 2-ethylhexyl adipate, 18 parts of polyethylene glycol oleylether sulfate and 5 parts of dibutylmaleate. The paste was charged into the reaction vessel as described in Example 3, following by introducing two parts of ammonium persulfate and 700 parts of water.

After the reaction vessel was closed, the ambient atmosphere therein was replaced with nitrogen gas and further the gas pressure was reduced below atmospheric pressure.

Then, 200 parts of vinyl chloride were introduced into the reaction vessel, the agitator was rotated at 1000 rpm and the reaction mixture was heated at 70° C. The temperature and the agitation were maintained for 13 hours to effect polymerization.

After polymerization was completed 15 parts of polymerized organic mercapto-compound was added, followed by additional agitation for another 30 minutes. The reaction product was recovered by centrifuging the reaction mixture and was dried. During the drying procedure, there was produced a small quantity of lumps of the product. Those lumps were pulverized to adjust the particle size to pass through a sieve of 60 mesh after the drying procedure.

A powder polymer having an average degree of polymerization of 600, a particle size of 50 to 200 microns and a bulk density of 0.32 was obtained with a polymerization yield of 95%.

The powder composition thus obtained, in which the pigment particles were essentially covered with resin, was coated on a surface of a substrate of complicated shape, with the result that all corners of the substrate were coated with a film of the powder paint. The plate bearing the powder paint was heated at 200° C for 7 minutes to effect fusion of the powder.

A beautiful blue coating film of 150 microns in thickness was obtained. The storage stability of the powder paint was excellent. No blocking of the powder was observed at 40° C.

EXAMPLE 10

There were charged 60 parts of titanium dioxide pigment, 20 parts of 2-ethylhexyl phthalate, 20 parts of tricresyl phosphate, 10 parts of sodium dodecylbenzensulfonate, 22 parts of polyethyleneglycol laurylether, 4 parts of organic tin maleate and 3 parts of vinyl propionate into the reaction vessel as described in Example 4 and then were charged 1 part of ammonium persulfate, 8 parts of carbon tetrachloride and 1500 parts of water.

After the reaction vessel was closed, the ambient atmosphere in the reaction vessel was replaced with nitrogen gas and further the gas pressure was reduced below atmospheric pressure. Then, 400 parts of vinyl chloride monomer were introduced into the reaction vessel.

The agitator was rotated at 400 rpm and the reaction mixture was heated at a temperature of 65° C. The temperature and the agitation were maintained for 15 hours to effect polymerization. After the polymerization was completed, 30 parts of polymerized organic mercapto-compound was added, followed by additional agitation for another 30 minutes.

The reaction product was recovered by centrifuging the reaction mixture and was dried.

A polymer powder was obtained having an average degree of polymerization of 490, a particle size of 70 to 130 microns and a bulk density of 0.34 with a polymerization yield of 93%.

The powder composition was coated on a plate by the procedure as described in Example 7. The plate bearing the powder paint was heated at 190° C for 5 minutes to effect fusion and there was obtained a beautiful white coating film. No blocking of the powder was observed at even 40° C. The storage stability of the powder was excellent.

EXAMPLE 11

There were charged 10 parts of quinacridone red, 35 parts of 2-ethylhexyl phthalate, 16 parts of alkylpicoliniumchloride, 4 parts of epoxidized soybean oil and 0.1 part of acrylic acid into a reaction vessel as described in Example 5, followed by introducing 1 part of ammonium persulfate, 0.1 part of n-butyl mercaptan, 1 part of carbon tetrachloride and 400 parts of water. After the same handling of the reaction vessel as followed in the preceding examples, 200 parts of vinyl chloride monomer were introduced. The resulting reaction mixture was heated at 70° C and agitated by rotating the agitator at 800 rpm.

The temperature and the agitation were maintained for 10 hours to effect polymerization.

After the polymerization was completed, 10 parts of polymerized organic mercapto-compound were added, followed by agitation for 5 minutes. The reaction product was recovered by centrifuging the reaction mixture and was dried and passed through a sieve of 60 mesh, accompanied by pulverizing any residue left on the sieve by the operator's fingers so that it passed through the sieve.

There was obtained a powder composition having an average degree of polymerization of 480, a particle size of 40 to 200 microns and a bulk density of 0.42 with a polymerization yield of 90%.

The powder composition was coated on a plate by electrostatic spray coating as described in Example 7 and the plate was heated at 190° C for 5 minutes to effect fusion, whereby a beautiful red coating film of 150 microns in thickness was obtained. No blocking of the powder composition was observed at 40° C. The storage stability of the powder composition was excellent.

EXAMPLE 12

15 parts of Fast Yellow pigment, 16 parts of polyethyleneglycol oleylethersulfate, 5 parts of organic tin maleate, 1 part of styrene, 10 parts of 2-ethylhexyl phthalate, and 10 parts of a high polymer plasticizer: Paraplex G-25 (Rohm and Haas Co.) were mixed thoroughly and the obtained mixture was charged into a reaction vessel as described in Example 9, followed by introducing 0.6 part of potassium persulfate and 500 parts of water. After the reaction vessel was closed, the ambient atmosphere in the reaction vessel was replaced with nitrogen gas and further the gas pressure was reduced below atmospheric pressure.

Then 200 parts of vinyl chloride monomer were added and the reaction mixture was heated at 70° C, and agitated by rotating the agitator at 1200 rpm.

The agitation and the temperature were maintained for 8 hours to effect polymerization. After the polymerization was completed, 15 parts of polymerized organic mercapto-compound was added, followed by additional agitation for another 30 minutes. The reaction product was recovered by centrifuging the reaction mixture and was dried.

A polymer powder was obtained having an average degree of polymerization of 520, a particle size of 50 to 150 microns and a bulk density of 0.36 with a polymerization yield of 95%. The polymer powder was coated on a plate in the same manner as described in Example 7, and the plate was heated at 185° C for 5 minutes to effect fusion, whereby a yellow coating film of 100 microns in thickness was obtained. No blocking of the powder was observed at 40° C. The storage stability thereof was excellent.

Some physical properties of the powder compositions of Examples 7 to 12 and of the coating film obtained by the application thereof are shown in Table 1.

As seen in Table 1, the fusing temperatures of the powder compositions of these Examples were low and all coating films of these powder compositions were excellent in chemical resistance, water resistance and durability.

COMPARATIVE TEST 10

In the same manner as described in Comparative Test 1, 0.5 part of polyvinyl alcohol, 0.02 part of hydroxyethylcellulose, 0.2 part of ethylcellulose, 2 parts of ethylacrylate, 8 parts of vinyl propionate, 0.3 parts of benzoyl peroxide and 400 parts of water was subjected to polymerization with 200 parts of vinyl chloride monomer at a temperature of 75° C for 8 hours, with agitation by rotating the agitator at 800 rpm, whereby there was obtained a polymer powder having an average degree of polymerization of 560 and a particle size of 60 to 160 microns with a polymerization yield of 92%. There were charged 100 parts of this dried polymer powder, 40 parts of 2-ethylhexyl phthalate, 15 parts of titanium dioxide pigment and 4 parts of tribasic lead sulfate into a high speed mixer, dry blending the mixture, thereby obtaining a powder paint having a particle size of 80 to 190 microns. The powder paint was coated on a plate by the procedure described in Example 7, and the plate was heated at 180° C for 5 minutes and failed to form a film but it was further heated at 210° C for 5 minutes to effect fusion, thereby obtaining a coating film of 200 microns in thickness. However, during the procedure, the plasticizer of the powder composition vaporized violently and moveover the thus obtained coating film was soft and easily damaged.

COMPARATIVE TEST 11

Following the procedure of Comparative Test 2, the reaction mixture was subjected to polymerization using 25 parts of 2-ethylhexyl phthalate, instead of 80 parts of butylacrylate, and 270 parts of vinyl chloride, instead of 187 parts thereof, at 65° C, thereby obtaining a white powder having an average degree of polymerization of 470 and a particle size of 80 to 300 microns with a polymerization yield of 90%. The thus obtained powder was covered with pigment particles on its surface, but the pigment and the resin separated from each other. The powder composition was coated on a plate and the plate was heated at 200° C for 5 minutes to effect fusion, but an acceptable coating film was not obtained. The plate was further heated at 230° for 10 minutes to effect fusion but the thus obtained coating film was not smooth enough and it was discolored owing to heat decomposition.

COMPARATIVE TEST 12

A mixture of the following:
vinyl chloride: 300 parts
2-ethylhexyl phthalate: 30 parts
titanium dioxide: 63 parts
polyethyleneglycolsorbitanmonolaurate: 19 parts
benzoyl peroxide: 11 parts
organic tin mercapto-compound: 74 parts
polymerized organic tin maleate: 10 parts
n-butanol: 500 parts
was subjected to polymerization under the following polymerization conditions:
polymerization temperature: 65° C
duration of polymerization 40 hours
speed of agitator: 500 rpm However, the above-mentioned organic mercapto-compound was added after the polymerization reaction was over.

Coarse polymer powders were obtained having an average degree of polymerization of 460, and a particle size of 400 to 800 microns with a polymerization yield of 85%.

The powder composition was coated on a plate and then the plate was heated at 200° C for 10 minutes to effect fusion. A practical coating film was obtained but the storage stability of the powder composition and the smoothness of the film were poor.

COMPARATIVE TEST 13

Following the procedure of Example 8, but using 0.1 part of benzoyl peroxide (oil soluble catalyst) instead of ammonium persulfate and potassium persulfate, there was obtained a coarse powder composition of above 300 microns in particle size. It was unsuitable for electrostatic spray coating.

COMPARATIVE TEST 14

Following the procedure of Example 7, but using 18 parts of polyethyleneglycolsorbitanmonolaurate, instead of 70 parts thereof, there was obtained a powder composition having an average degree of polymerization of 480 and a particle size of 70 to 150 microns and a bulk density of 0.35 with a polymerization yield of 90%. The obtained powder was covered continuously with pigment particles on its surface.

The powder composition was coated on a plate. The plate was heated at 220° C to effect fusion, but a practical coating film was not obtained. The volume intrinsic resistivity of the powder had an unacceptably low value of $10^7$ ohm-cm so that the powder was unsuitable for electrostatic spray coating.

COMPARATIVE TEST 15

The same procedure was followed in polymerizing the reaction mixture as described in Example 7, except that the rotation rate of the agitator was 150 rpm.

The particle size of the solids in the thus obtained emulsion was too small to permit recovery by centrifuging. Then 10 parts of sodium chloride was added into the emulsion, thereby precipitating the solid component thereof. The precipitate was dried, crushed and sieved, whereby a powder having particle size of 40 to 120 miccrons was obtained.

The powder was coated on a plate and the plate bearing the powder was heated at 190° C for 15 minutes to effect fusion. The thus obtained coating film was poor in thermostability and it cracked.

COMPARATIVE TEST 16

Following the procedure of Example 9 except that the amount of water was increased to 850 parts, there was obtained a powder paint composition having an average degree of polymerization of 540, a particle size of 60 to 150 microns and bulk density of 0.22 with a polymerization yield of 91%. The powder paint thus obtained was coated on a surface of a substrate of complicated shape, so that all corners of the substrate were coated with a film of the powder paint.

The material was heated at 200° C for 10 minutes to effect fusion but the thus coated film shrank at the corners and cracked.

COMPARATIVE TEST 17

A paste was prepared by mixing 30 parts of titanium dioxide pigment, 18 parts of sorbitan monostearate (HLB 4,7), 4 parts of organic tin maleate, 3 parts of butyl acrylate and 20 parts of 2-ethylhexyl phthalate in a high speed mixer. The paste was charged into a reaction vessel, followed by adding 1 part of ammonium persulfate, 0.2 part of n-butylmercaptan and 500 parts of water and then closing the vessel, replacing the atmospheric therein by nitrogen gas and reducing the pressure below atmospheric, and then introducing 160 parts of vinyl chloride monomer.

The reaction mixture was heated, agitated by rotating the agitator at 800 rpm, whereby there was obtained a coarse powder, most particles of which were more than 300 microns in particle size. This powder was unfit for electrostatic spray coating.

Some physical properties of the powder paints of the proceeding Comparative Tests 10 to 17 and of the coating film formed by the application thereof are shown in Table 1.

As shown in Table 1, these coating films of the Comparative Tests were worse in chemical resistance, water resistance and exterior durability and were of hardness of about 2H (pencil).

EXAMPLE 13

A paste was prepared by mixing thoroughly 25 parts of titanium dioxide, 6 parts of polyethyleneglycolnonylphenylether of HLB 14, 20 parts of ethyl acrylate, 80 parts of ethyl methacrylate and 5 parts of styrene in a high speed rotating mixer. This paste was charged into a reaction vessel as described in Example 1 except that the agitator had the same type and numbers of impellers, of which the arms were 7.5 cm in length, followed by adding 1 part of ammonium persulfate, 0.2 part of ethylmercaptan and 300 parts of water.

After the ambient atmosphere in the reaction vessel was substituted with nitrogen gas by the procedure as described in the preceding Examples, the resulting mixture was heated at 60° C, agitated by rotating the agitator at 800 rpm. The temperature and the agitation were maintained for 8 hours to effect polymerization. The reaction mixture was worked up by the same procedure as described in the preceding Examples, and a powder composition was obtained having a particle size of 60 to 130 microns and a bulk density of 0.32 with a polymerization yield of 95%. The powder composition was subjected to electrostatic spray coating on a cold-rolled steel sheet (JIS-G-3141) and then the steel sheet was heated at 200° C for 5 minutes for fusing and baking the coating, whereby a beautiful white coating film of 100 microns in thickness was obtained.

EXAMPLE 14

There were mixed 10 parts of carbon black and 20 parts of butyl methacrylate and into the mixture were added 8 parts of sodium dodecylbenzenesulfonate and 180 parts of butyl methacrylate and the mixture mixed thoroughly by a high speed rotating mixer to obtain a paste.

The paste was charged into a reaction vessel as described in Example 13, followed by adding 0.2 part of potassium persulfate, 0.3 part of thiophenol and 500 parts of water.

The resulting mixture was subjected to polymerization at a polymerization temperature of 65° C, at a number of revolutions of the agitator of 1000 rpm and the duration of polymerization was 10 hours, whereby there was obtained a powder composition having a particle size of 60 to 140 microns and a bulk density of 0.35 with a polymerization yield of 96%.

The pigment particles were dispersed into the interior of the powder particles and the volume intrinsic resistivity thereof was $7 \times 10^{15}$ Ω.cm. The powder composition was subjected to electrostatic spray coating by the procedure as described in Example 13 whereby a beautiful white coating film of 50 microns in thickness was obtained after the fusion at 180° C for 6 minutes.

EXAMPLE 15

To a mixture of 20 parts of titanium dioxide, 3 parts of phthalocyanineblue, 120 parts of ethyl methacrylate and 30 parts of butyl methacrylate, there were added 12 parts of polyethylenglycol sorbitan monostearate, and the thus obtained mixture was mixed thoroughly by a high speed rotary mixer to obtain a paste. The paste was charged into a vessel as described in Example 13, followed by adding 0.3 part of potassium persulfate, 0.3 part of ammonium persulfate, 0.1 part of n-butylmercaptan and 400 parts of water.

Then the ambient atmosphere in the reaction vessel was replaced with nitrogen gas. The resulting mixture was subjected to polymerization at a polymerization temperature of 70° C, a rotation rate of the agitator of 700 rpm and a duration of polymerization of 8 hours.

After the reaction was complete, 2 parts of dioctylsulfide and 1 part of phenyl salicylate were added into the reaction vessel, followed by agitation for 30 minutes, whereby there was obtained a powder having a particle size of 30 to 120 microns and a bulk density of 0.34 with a polymerization yield of 93%.

In this powder composition the pigment particles were not substantially on the surface of the polymer particles, but rather the pigment particles were dispersed into the interior of polymer particles. The powder composition was applied by electrostatic spray coating onto a steel plate by the procedure as described in Example 13, and then the coated plate was heated at 205° C for 5 minutes for fusing the powder, whereby a beautiful blue coating film of 40 microns in thickess was obtained.

EXAMPLE 16

A paste was prepared by mixing thoroughly 15 parts of quinacridone, 10 parts of polypropyleneglycol polyethleneglycolether, 6 parts of alkylpicoliniumchloride, 150 parts of methyl methacrylate, 50 parts of butyl acrylate and 25 parts of 2-ethylhexyl phthalate in a high speed rotary mixer. The paste was charged into a reaction vessel as described in Example 13, and then there were added 0.5 part of ammonium persulfate, 0.2 part of dodecylmercaptan and 800 parts of water.

The ambient atmosphere in the reaction vessel was replaced with nitrogen gas and the resulting mixure was heated at 70° C, and agitated by rotating the agitator at 1200 rpm. The temperature and the agitation were maintained for 12 hours to effect polymerization, whereby there was obtained a powder composition having a particle size of 60 to 150 microns and a bulk density of 0.25 with a polymerization yield of 98%.

The powder composition was applied by electrostatic spray coating onto a plate, as described in Example 13, and the plate was heated at 190° C for 6 minutes for fusing the powder, whereby a beautiful red coating film of 180 microns in thickness was obtained.

EXAMPLE 17

To a mixture of 15 parts of Hansa Yellow, 60 parts of ethyl methacrylate, and 40 parts of butyl methacrylate, were added 3 parts of dodecylbenzene ethoxysulfate and 4 parts of polyethyleneglycol laurylether. The resulting mixture was mixed thoroughly in a high speed rotary mixer to obtain a paste. The paste was charged into a reaction vessel as described in Example 13, followed by adding 0.3 part of ammonium persulfate, 0.05 part of n-butylmercaptan and 350 parts of water.

After the ambient atmosphere in the reaction vessel was replaced with nitrogen gas, the reaction mixture was heated at 70° C, and agitated by rotating the agitator at 700 rpm. The temperature and the agitation was maintained for 6 hours to effect polymerization.

After the reaction was completed, 2 parts of dioctylsulfide were added to the reaction vessel, followed by agitation for 30 minutes. A powder composition was obtained having a particle size of 50 to 160 microns and a bulk density of 0.32 with a polymerization yield of 93%. The powder composition was applied by electrostatic spray coating onto a plate as described in Example 13, and the plate was heated at 195° C for 6 minutes for fusing the powder, whereby a beautiful yellow coating film of 80 microns thickness was obtained.

EXAMPLE 18

Following the procedure of Example 15, at 5 hours from the start of the polymerization reaction, 10 parts of acrylic acid were added to the reaction vessel. After the polymerization was completed, Epicoat 828 was added, followed by agitation for 30 minutes. The obtained solid product was separated from the reaction mixture by a super-decanter and was dried, whereby there was obtained a powder paint composition having a particle size of 60 to 120 microns and a bulk density of 0.35 with a polymerization yield of 94%.

This powder composition, in which the pigment particles were dispersed substantially uniformly in the interior of the polymer particles, was applied by electrostatic spray coating onto a plate as described in Example 13 and then the plate was heated at 205° C for 5 minutes for fusing the powder, whereby a beautiful pale blue coating film of 70 microns in thickness was obtained. Further additional heating for 15 minutes resulted in a hardened coating film which was extremely excellent in chemical resistance.

EXAMPLE 19

Following the procedure of Example 14, after the polymerization reaction was completed, 10 parts of Epicoat 828 (a product of Shell Chemical Co.) and 1.1 parts of dicyandiamide were added, followed by agitation for 10 minutes. The thus obtained product was separated from the reaction mixture by a centrifugal separator and was dried, whereby there was obtained a powder composition having a particle size of 40 to 110 microns and a bulk density of 0.35 with a polymerization yield of 95%. The powder composition, in which the pigment particles were substantially uniformly dispersed in the interior of the polymer particles, was applied by electrostatic spray coating onto a plate as described in Example 13 and the plate was heated at 180° C for 5 minutes for fusing the powder whereby a beautiful black coating film was obtained.

EXAMPLE 20

To a mixture of 30 parts of carbon black and 50 parts of methyl methacrylate were added 25 parts of polyethyleneglycolsorbitanmonostearate, 100 parts of methyl methacrylate, 50 parts of lauryl methacrylate, 10 parts of methyl acrylate and 3 parts of 4-vinyl pyridine in a high speed rotary mixer and the obtained mixture was mixed thoroughly to obtain a paste.

The paste was charged into a reaction vessel as described in Example 13, followed by adding 0.1 part of potassium persulfate, 0.4 part of sodium bicarbonate and 600 parts of water and then the ambient atmosphere in the reaction vessel was replaced with nitrogen gas. The reaction mixture was heated at 80° C, agitated by rotating the agitator at 1000 rpm. The temperature and the agitation were maintained to effect polymerization. After 3 hours from commencement of the polymerization reaction, there were added 4 parts of glycidyl methacrylate, followed by agitation for 2 hours.

After the polymerization reaction was over, 2 parts of dioctylsulfide were added, followed by agitation for 20 minutes, whereby the thus obtained suspension of pH7.5 was centrifuged to obtain the solids which were then dried.

A powder composition was obtained having particle size of 50 to 150 microns and a bulk density of 0.35 with a polymerization yield of 95%. The thus obtained powder composition was applied by electrostatic spray coating onto a plate as described in Example 13 and the plate was heated at 200° C for 15 minutes for fusing the powder, whereby a beautiful black coating film of 90 microns in thickness was obtained.

EXAMPLE 21

There were charged 25 parts of titanium dioxide, 10 parts of polyethylenesorbitanmonolaurate, 40 parts of methyl acrylate, 60 parts of butyl methacrylate, 3 parts of acrylic acid, 0.3 part of ammonium persulfate, 0.1 part of n-butylmercaptan, and 180 parts of water into a reaction vessel as described in Example 13 and then the ambient atmosphere in the reaction vessel was replaced with nitrogen gas.

The reaction mixture was heated at 70° C, and was agitated by rotating the agittor at 800 rpm.

The temperature and the agitation was maintained for 7 hours for effecting the polymerization, whereby there was obtained a powder composition having a particle size of 50 to 170 microns and a bulk density of 0.32 with a polymerization yield of 95%.

The powder composition was applied by electrostatic spray coating onto a plate as described in Example and then the plate was heated at 170° C for 10 minutes for fusing the coating, whereby a beautiful white coating film of 120 microns in thickness was obtained.

EXAMPLE 22

A mixture of 25 parts of titanium dioxide, 5 parts of carbon black, 20 parts of ethyl methacrylate, 80 parts of butyl methacrylate, 6 parts of polyethyleneglycolsorbitanmonolaurate, 0.2 part of ammonium persulfate, 0.2 part of n-butylmercaptan and 350 parts of water was charged into a reaction vessel as described in Example 13 and then the ambient atmosphere in the reaction vessel was replaced with nitrogen gas.

The reaction mixture was heated at 70° C and agitated by rotating the agitator at 800 rpm.

The temperature and the agitation were maintained for 8 hours to effect the polymerization.

The reaction product was separated from the reaction mixture by a centrifugal separator and was dried, whereby there was obtained a powder composition having a particle size of 60 to 150 microns and a bulk density of 0.35 with a polymerization yield of 98%.

The powder composition was applied by electrostatic spray coating onto a plate as described in Example 13, and the plate was heated at 205° C for 5 minutes for fusing the powder, whereby there was obtained a gray coating film of 100 microns in thickness.

Some physical properties of each of the powder compositions of Examples 13 to 22 as well as the coating films formed therefrom are shown in Table 1. As seen in Table 1, the fusing temperature of each of these powder compositions is low, and each coating film is superior in chemical resistance and durability.

COMPARATIVE TEST 18

Following the procedure of Example 13, a reaction mixture was subjected to polymerization using polyethyleneglycolnonylphenylether of HLB 12, instead of polyethyleneglyeolnonylphenylether of HLB 14, and after the polymerization was completed, the obtained product was separated from the reaction mixture, whereby a powder composition was obtained having a particle size of 1 to 15 mm with a polymerization yield of 93%.

The paint composition was pulverized by a pulverizer to obtain a powder of 60 to 150 microns and the thus obtained powder had a sharp-edged shape. The powder composition was applied by electrostatic spray coating onto a plate as described in Example 13 and the plate was heated at 200° C for 5 minutes for fusing the powder, but a flat and smooth coating film was not obtained. The plate was heated at 210° for 5 minutes for further fusing, whereby a flat coating film thereof was obtained but it gave off an odor of decomposition violently.

COMPARATIVE TEST 19

A reaction mixture was subjected to polymerization in the same manner as in Example 13 except that 4 parts of sodium dodecylbenzenesulfonate was used as the emulsifier, whereby a powder composition having a particle size of 80 to 170 microns with a polymerization yield of 93% was obtained.

The thus obtained powder composition had a substantial part of the pigment on its surface. It was subjected to elecstatic spray coating on a plate as in Exaple 13 and the plate was heated at 200° C for 5 minutes for fusing the powder but a coating film was not obtained. Then the plate was further heated at 210° C for 15 minutes for fusing, whereby the powder decomposed with the result that a satisfactory coating film was not obtained.

COMPARATIVE TEST 20

A reaction mixture was subjected to polymerization by the same procedure as followed in Example 13 except that 3 parts of benzoyl peroxide was used as a catalyst.

A powder composition was obtained having a particle size of 50 to 180 microns with a polymerization yield of 94%.

Since the particles of the powder composition were not of spherical shape and a part of pigment particles thereof was dispersed on its surface, it was unsuitable for electrostatic spray coating.

The powder paint was applied by electrostatic spray coating onto a plate as described in Example 13, and the plate was heated at 200° C for 6 minutes for fusing the powder, but a coating film thereof was not obtained. The plate was further heated at 200° C for 10 minutes, but nevertheless the resin component thereof decomposed so severely that a sufficient coating film was not obtained.

COMPARATIVE TEST 21

A reaction mixture was subjected to polymerization by the procedure as followed in Example 14 except that 1200 parts of water were used. After the reaction, the obtained product was separated from the reaction mixture by a centrifugal separator and was dried, whereby there was obtained a powder composition having a particle size of 80 to 210 microns and a bulk density of 0.15 with a polymerization yield of 92%.

The powder paint was applied by electrostatic spray coating onto a substrate of complicated shape and the material was heated at 190° C for 5 minutes for fusing the powder and a coating film was obtained, but the coating film was cracked at the corners.

COMPARATIVE TEST 22

A reaction mixture was subjected to polymerization in a similar manner as described in Example 14 except that the agitator was rotated at 100 rpm.

After the reaction was completed, the obtained product was separated from the reaction mixture by a centrifugal separator but most of the product passed through the filter cloth of the centrifugal separator and was not recovered.

This shows that there can not be obtained particles of suitable size for electrostatic spray coating if the emulsionpolymerization is not conducted under vigorous stirring. The powder composition recovered on the surface of the filter cloth was dried. The powder composition was obtained with a polymerization yield of 10% and its particle size was 15 to 45 microns. Then the powder composition was coated by electrostatic spray coating onto a plate as described in Example 14, and the plate was heated at 185° C for 5 minutes for fusing the powder, whereby a coating film of 80 microns in thickness was obtained.

COMPARATIVE TEST 23

The same procedure was followed in obtaining a powder composition except that the agitator was rotated at 2000 rpm. After the reaction was completed, the obtained product was dried with the result that a powder composition having a particle size of 100 to 250 microns was obtained with a polymerization yield of 93% and the pigment particles thereof adhered on the surface of the polymer particles.

The powder composition was applied by electrostatic coating onto a plate as described in Example 14, and the plate was heated at 180° C for 5 minutes for fusing the powder, but a coating film was not obtained.

Then the plate was further heated at 200° C for 10 minutes for fusing the powder but the paint decomposed so severely that a sufficient coating film was not obtained.

COMPARATIVE TEST 24

A mixture of 80 parts of butyl methacrylate, 20 parts of ethyl methacrylate, 5 parts of polyethylenesorbitan monostearate, 0.3 part of postassium persulfate, 500 parts of water and 0.2 part of n-butylmercaptan was charged into a reaction vessel as described in Example 13.

The reaction mixture was heated at 60° C and was agitated by rotating the agitator at 100 rpm. The temperature and the agitation was maintained for 6 hours for effecting the polymerization, with the result that the obtained polymer could not be separated from the emulsion by a mechanical separator.

Then the emulsion was subjected to salting out, followed by drying and crushing the obtained product. A powder polymer having a particle size of 10 to 25 microns was obtained.

There was added 100 parts of the powder polymer, 15 parts of titanium dioxide and 10 parts of 2-ethylhexyl phthalate in a high speed rotary mixer.

The resulting mixture was mixed thoroughly, whereby a powder composition having a size of 50 to 150 microns was obtained.

The powder composition was applied by electrostatic spray coating onto a plate as described in Example 13 and the plate was heated at 200° C for 5 minutes for fusing the powder but a coating film was not obtained.

Further the plate was heated at 220° C for 10 minutes for fusing the coating but the powder composition decomposed so severely that a satisfactory coating film was not obtained.

Some physical properties of each powder composition of Comparative Tests 18 to 24 as well as the coating film prepared therefrom are shown in Table 1.

Table I

| | Properties of powder paint composition | | Properties of coating film | | | | Hardness of pencil heat tears the film |
|---|---|---|---|---|---|---|---|
| | Index of flow rate | Volunic resistivity | Fusing conditions | Chemical resistance | Water resistance | Exterior durability | |
| Example | | | | | | | |
| 1 | 78 | $2.5 \times 10^{12}$ ohm-cm | 185° C × 5 min | ⊚ | ⊚ | ⊚ | 2H |
| 2 | 75 | $4.2 \times 10^{12}$ ohm-cm | 190° C × 5 min | ⊚ | ⊚ | ⊚ | 2H |
| 3 | 73 | $2.7 \times 10^{12}$ ohm-cm | 200° C × 7 min | ⊚ | ⊚ | ⊚ | 3H |
| 4 | 70 | $1.5 \times 10^{12}$ ohm-cm | 190° C × 5 min | ⊚ | ⊚ | ⊚ | 2H |
| 5 | 76 | $1.8 \times 10^{12}$ ohm-cm | 190° C × 5 min | ⊚ | ⊚ | ⊚ | 2H |
| 6 | 74 | $2.7 \times 10^{12}$ ohm-cm | 185° C × 5 min | ○ | ○ | ○ | H |
| Comparitive test | | | | | | | |
| 1 | 51.5 | $0.2 \times 10^{12}$ ohm-cm | 210° C × 5 min | Δ | Δ | X | 3B |
| 2 | 53.0 | $0.2 \times 10^{12}$ ohm-cm | 200° C × 5 min +210° C × 10 min | Δ | Δ | X | H |
| 3 | — | — | 200° C × 10 min | Δ | Δ | Δ | HB |

Table I-continued

| | Properties of powder paint composition | | Properties of coating film | | | | Hardness of pencil heat tears the film |
|---|---|---|---|---|---|---|---|
| | Index of flow rate | Volumic resistivity | Fusing conditions | Chemical resistance | Water resistance | Exterior durability | |
| 4 | 72 | 2.8 × 10¹² ohm-cm | 195° C × 8 min | ⊚ | ⊚ | ⊚ | H |
| 5 | 74 | 2.6 × 10¹² ohm-cm | — | — | — | — | — |
| 6 | 75 | 1.2 × 10⁷ | — | — | — | — | — |
| 7 | 70 | 3.5 × 10¹² | 185° C × 9 min | X | X | X | 2H |
| 8 | 70 | 3.0 × 10¹² ohm-cm | 200° C × 10 min | X | X | X | 3H |
| 9 | — | — | — | — | — | — | — |
| Example | | | | | | | |
| 7 | 79 | 1.8 × 10¹² ohm-cm | 185° C × 5 min | ⊚ | ⊚ | ⊚ | 2H |
| 8 | 73 | 2.3 × 10¹² ohm-cm | 190° C × 5 min | ⊚ | ⊚ | ⊚ | H |
| 9 | 72 | 2.8 × 10¹² ohm-cm | 200° C × 7 min | ⊚ | ⊚ | ⊚ | 3H |
| 10 | 74 | 1.6 × 10¹² ohm-cm | 190° C × 5 min | ⊚ | ⊚ | ⊚ | 2H |
| 11 | 70 | 1.5 × 10¹² ohm-cm | 190° C × 5 min | ○ | ○ | ○ | HB |
| 12 | 75 | 2.2 × 10¹² ohm-cm | 185° C × 5 min | ⊚ | ⊚ | ⊚ | 2H |
| Comparative test | | | | | | | |
| 10 | 51.5 | 0.2 × 10¹² ohm-cm | 210° C × 5 min | Δ | Δ | X | 3B |
| 11 | 53.0 | 0.2 × 10¹² ohm-cm | 200° C × 5 min +210° C × 10 min | Δ | Δ | X | 2H |
| 12 | — | — | 200° C × 10 min | Δ | Δ | X | 2H |
| 13 | — | — | — | — | — | — | — |
| 14 | 74 | 1.5 × 10⁷ | — | — | — | — | — |
| 15 | 71 | 1.7 × 10¹² | 190° C × 15 min | X | X | X | 2H |
| 16 | 71 | 2.4 × 10¹² ohm-cm | 200° C × 10 min | X | X | X | 3H |
| 17 | — | — | — | — | — | — | — |
| Example | | | | | | | |
| 13 | 75 | 8 × 10¹⁴ ohm-cm | 200° C × 5 min | ⊚ | ⊚ | ⊚ | 3H |
| 14 | 78 | 7 × 10¹⁵ ohm-cm | 100° C × 6 min | ⊚ | ⊚ | ⊚ | 2H |
| 15 | 73 | 5 × 10¹⁵ ohm-cm | 205° C × 5 min | ⊚ | ⊚ | ⊚ | 3H |
| 16 | 75 | 8 × 10¹² ohm-cm | 190° C × 6 min | ⊚ | ⊚ | ⊚ | 2H |
| 17 | 77 | 2 × 10¹⁵ ohm-cm | 195° C × 6 min | ⊚ | ⊚ | ⊚ | 3H |
| 18 | 75 | 2 × 10¹⁵ ohm-cm | 205° C × 5 min | ⊚ | ⊚ | ⊚ | 4H |
| 19 | 79 | 6 × 10¹⁴ ohm-cm | 180° C × 5 min | ⊚ | ⊚ | ⊚ | 4H |
| 20 | 72 | 6 × 10¹⁴ ohm-cm | 200° C × 15 min | ⊚ | ⊚ | ⊚ | 4H |
| 21 | 74 | 2 × 10¹⁵ ohm-cm | 170° C × 10 min | ⊚ | ⊚ | ⊚ | 3H |
| 22 | 75 | 4 × 10¹⁴ ohm-cm | 205° C × 5 min | ⊚ | ⊚ | ⊚ | 3H |
| Comparative test | | | | | | | |
| 18 | 45 | 3 × 10¹⁰ ohm-cm | 210° C × 10 min | Δ | ○ | Δ | 3H |
| 19 | 68 | 5 × 10¹² ohm-cm | 200° C × 5 min 210° C × 15 min | X | X | X | 2H |
| 20 | 66 | 8 × 10⁸ ohm-cm | 200° C × 6 min 200° C × 10 min | X | X | X | 3H |
| 21 | 72 | 8 × 10¹⁵ ohm-cm | 190° C × 5 min | ○ | ○ | ○ | 2H |
| 22 | 75 | 3 × 10¹⁵ ohm-cm | 185° C × 5 min | ⊚ | ⊚ | ⊚ | 2H |
| 23 | 70 | 5 × 10⁸ ohm-cm | 185° C × 5 min | — | — | — | — |
| 24 | 68 | 4 × 10¹² ohm-cm | 200° C × 5 min 220° C × 10 min | — | — | — | — |

Note
1. Index of flow rate was measured by the Kah method using a powder tester manufactured by Hosokawa Iron Works of Japan. The flow rate is better as this value approaches 100.
2. Bulk density was measured by the process of measuring bulk density in the packed slate using the tester as described in Note 1.
3. Volume intrinsic resistivity is the value of resistance measured when the sample is charged at 500 V, D.C., for 1 minute of charging using the resistance measuring instrument of Takeda Riken Co., Ltd.
4. Chemical resistivity was evaluated by color changes of the samples that occurred when they were immersed in 10% NaOH solution and 10% H₂SO₄ solution for 7 days, respectively.
5. Exterior durability was evaluated by the change of appearance of the sample after it was exposed outdoors for one year.
6. Water resistance was evaluated by the change of the sample which was immersed in distilled water for one week.

Evaluation Standards
⊚ Excellent
Δ Inferior
O Good
X Bad

The embodiments of the invention in which an exclusive property or privilege is claimed are defined as follows:

1. A process for preparing powder compositions suitable for dry electrostatic spray coating, comprising the steps of emulsion polymerizing a reaction mixture of
   1. first monomer component selected from the group consisting of vinyl chloride, monomer having the formula

wherein $R_1$ is hydrogen or methyl and $R_2$ is a hydrocarbon group having 1 to 18 carbon atoms, and mixtures of said monomers, 2. from 0 to 185 parts by weight, per 100 parts by weight of monomer component (1), of at least one comonomer copolymerizable with monomer component (1) and having a faster rate of polymerization than monomer component (1), 3. from 0.1 to 50 weight percent, based on the sum of components (1) and (2), of a water-insoluble pigment, 4. from 3 to 20 weight percent, based on the sum of components (1) and (2), of a water-soluble organic surfactant, 5. a water-soluble polymerization initiator in an amount effective to cause polymerization of components (1) and (2), and 6. from about 200 to about 400 weight percent, based on the sum of components (1) and (2), of an aqueous liquid medium while simultaneously vigorously agitating the reaction mixture throughout the polymerization so that the circulation number per minute of the reaction mixture is at least 3, wherein the circulation number per minute is equal to the integrated volume of the circulating flow of the reaction mixture per minute divided by the total volume of reaction mixture, in the polymerization vessel to produce substantially spherical polymer particles having a particle size within the range of about 30 to 250 microns, a bulk density of greater than 0.3 and a volume intrinsic resistivity of at least $10^9$ ohm-cm; separating the solid polymer particles from the aqueous medium and drying the polymer particles.

2. A process as claimed in claim 1, in which the circulation number per minute is from 5 to 30.

3. A process as claimed in claim 1, in which the reaction mixture contains at least one additive selected from the group consisting of plastic flow improving agents, stabilizers, ultraviolet ray absorbing agents, thermal stability improving agents, molecular weight adjusting agents and curing agents.

4. A process as claimed in claim 1, in which after the emulsion polymerization is completed and before the solid polymer is removed from the aqueous medium, a thermal decomposition preventing agent is added to the reaction system to be absorbed on the surfaces of the polymer particles.

5. A process as claimed in claim 1, in which said monomer component (1) consists essentially of vinyl chloride, the reaction mixture contains from 0.1 to 15 percent by weight, based on the combined weights of components (1) and (2), of a stabilizer for polymers containing vinyl chloride units, and the degree of polymerization of the polymer is from 300 to 600.

6. A process as claimed in claim 1, in which said monomer component consists essentially of a monomer of said formula.

7. A process as claimed in claim 1, in which said reaction mixture contains a fluidity improving agent.

8. A process as claimed in claim 5, in which prior to said emulsion polymerization step, said pigment, said surfactant and said monomer component (2) are premixed to form a uniform paste, and the paste thereby obtained is then mixed with said aqueous medium and said polymerization initiator and then the vinyl chloride is added to and mixed with the reaction mixture and then the reaction mixture is subjected to said emulsion polymerizing step.

9. A process as claimed in claim 1, in which the reaction mixture contains from 5 to 100 parts of monomer component (2) per 100 parts by weight of monomer component (1).

10. A powder paint composition adapted for application to substrates by a dry electrostatic spray coating process, consisting essentially of, substantially spherical, polymer particles having a particle size in the range of from 30 to 250 microns, a volume intrinsic resistivity in the range of from $10^9$ to $10^{13}$ ohm-cm and a bulk density of more than 0.3, said polymer particles having pigment particles embedded therein and uniformly dispersed throughout the interior thereof, the surfaces of the polymer particles being substantially free of adhering pigment particles, said pigment particles being present in an amount of from 0.1 to 50 weight percent, based on the sum of the weights of polymer components (1) and (2), said polymer consisting essentially of units of 1. first monomer component selected from the group consisting of vinyl chloride, monomer having the formula $$CH_2=C-\underset{\underset{R_1}{|}}{\overset{\overset{O}{\|}}{C}}-O-R_2$$

wherein $R_1$ is hydrogen or methyl and $R_2$ is a hydrocarbon group having 1 to 18 carbon atoms, and mixtures of said monomers 2. from 0 to 185 parts by weight, per 100 parts by weight of monomer component (1), of at least one comonomer copolymerizable with monomer component (1) and having a faster rate of polymerization then monomer component (1).

11. A powder paint composition as claimed in claim 10, in which said first monomer component is vinyl chloride, said polymer containing from 0.1 to 15 percent by weight of a stabilizer for polyvinyl chloride and said polymer having a degree of polymerization of from 300 to 600.

12. A powder paint composition as claimed in claim 10, in which said polymer consists of one or more monomer units of said formula.

13. A powder paint composition as claimed in claim 10, in which said polymer contains from 5 to 100 parts by weight of component (2) per 100 parts by weight of component (1).

14. A powder paint composition as claimed in claim 10, in which said particles contain one or more additives selected from the group consisting of plastic flow improving agents, stabilizers, ultraviolet ray absorbing agents, thermal stability improving agents, molecular weight adjusting agents and curing agents.

15. A powder paint composition as claimed in claim 10, in which the surfaces of said particles have a thermal decomposition preventing agent coated thereon.

16. A powder paint composition consisting essentially of the solid polymer particles prepared by the process of claim 1.

17. A process as claimed in claim 1 in which the vigorous agitation of the reaction mixture is effected by rotating an agitator having turbine blades at from 200 to 1200 rpm.

18. A powder paint composition as claimed in claim 12 containing a curing agent selected from the group consisting of dicyandiamide, boron trifluoride-piperidine, an epoxy compound or an acid anhydride effective to make said polymer thermosetting.

* * * * *